(12) United States Patent
Mori (10) Patent No.: US 12,330,208 B2
(45) Date of Patent: Jun. 17, 2025

(54) BLIND RIVET FASTENING APPARATUS

(71) Applicant: NEWFREY LLC, New Britain, CT (US)

(72) Inventor: Daisuke Mori, Toyohashi (JP)

(73) Assignee: NEWFREY LLC, New Britain, CT (US)

(*) Notice: Subject to any disclaimer, the term of this patent is extended or adjusted under 35 U.S.C. 154(b) by 1515 days.

(21) Appl. No.: 15/801,463

(22) Filed: Nov. 2, 2017

(65) Prior Publication Data
US 2018/0126446 A1     May 10, 2018

(30) Foreign Application Priority Data

Nov. 7, 2016 (JP) ................. 2016-217049

(51) Int. Cl.
*B21J 15/26* (2006.01)
*B21J 15/04* (2006.01)
(Continued)

(52) U.S. Cl.
CPC ............. *B21J 15/26* (2013.01); *B21J 15/043* (2013.01); *B21J 15/105* (2013.01); *B21J 15/28* (2013.01);
(Continued)

(58) Field of Classification Search
CPC ........ B21J 15/26; B21J 15/043; B21J 15/105; B21J 15/28; B21J 15/326; B21J 15/10;
(Continued)

(56) References Cited

U.S. PATENT DOCUMENTS 4,368,631 A    1/1983  Tanikawa
4,574,612 A *  3/1986  Tanikawa ............ B25B 27/0014
                                                              72/114

(Continued)

FOREIGN PATENT DOCUMENTS

EP         43217 A    1/1982
EP       2891826 A    7/2015
(Continued)

OTHER PUBLICATIONS

European Search Report Dated Mar. 28, 2019.
(Continued)

*Primary Examiner* — Bobby Yeonjin Kim
(74) *Attorney, Agent, or Firm* — Kofi A. Schulterbrandt (57) ABSTRACT

A blind rivet fastening device including a dual function clutch device. The clutch releases at the rear end position RP of the pulling head and the clutch slips at the home position HP. The device includes a spindle clutch axially movable with respect to the spindle and integrally rotated, and a nut clutch integrally formed with the ball screw nut. The spindle clutch can move in the axial direction and can release from the nut clutch. The spindle clutch also has a first segment portion; one end of the first segment portion is a vertical plane and the other end is a slanted plane. The nut clutch has second segment portions of complementary shape. When the pulling head reaches the rear end position RP, the clutch is disengaged. When the pulling head returns to the home position HP, the inclined faces of the clutch slip with each other.

9 Claims, 6 Drawing Sheets (51) Int. Cl.
  *B21J 15/10* (2006.01)
  *B21J 15/28* (2006.01)
  *B21J 15/32* (2006.01)
  *F16H 25/20* (2006.01)

(52) U.S. Cl.
  CPC ........ *B21J 15/326* (2013.01); *F16H 25/2021* (2013.01); *F16H 2025/2071* (2013.01)

(58) Field of Classification Search
  CPC ................. B21J 15/32; F16H 25/2021; F16H 2025/2071
  USPC ..................................................... 29/243.526
  See application file for complete search history.

(56) References Cited

U.S. PATENT DOCUMENTS

| | | | | |
|---|---|---|---|---|
| 5,131,255 A | * | 7/1992 | Fushiya | B21J 15/022 |
| | | | | 29/243.526 |
| 5,605,070 A | * | 2/1997 | Wille | F16D 41/206 |
| | | | | 72/391.4 |
| 9,968,988 B2 | | 5/2018 | Masugata | |
| 2007/0145806 A1 | | 6/2007 | Wilder et al. | |
| 2015/0074964 A1 | * | 3/2015 | Masugata | B21J 15/26 |
| | | | | 29/243.526 |

FOREIGN PATENT DOCUMENTS

| | | |
|---|---|---|
| GB | 1457326 A | 12/1976 |
| JP | 50037072 A | 4/1975 |
| JP | 2013248643 A | 12/2013 |
| KR | 100887542 B | 3/2009 |
| TW | 201350284 A | 12/2013 |
| WO | 2013180769 A | 12/2013 |

OTHER PUBLICATIONS

Chinese Office Action Dated Nov. 26, 2018.
Chinese Office Action Dated Aug. 5, 2019.
Office Action dated Nov. 26, 2020 issued in corresponding TW Application No. 106138441.
Office Action dated Oct. 20, 2020 issued in corresponding EP Application No. 17200465.7.
Notification of Reason of Rejection dated Aug. 6, 2020 issued in corresponding JP Application No. 2016-217049.

* cited by examiner

BLIND RIVET FASTENING APPARATUS

CROSS-REFERENCE TO RELATED APPLICATIONS

This application claims priority from Japanese Patent Application No. 2016-217049, filed Nov. 7, 2016, the disclosure of which is incorporated herein by reference in its entirety.

FIELD OF THE INVENTION

The present invention concerns a blind rivet fastening device using an electric motor; more particularly, it concerns a blind rivet fastening device that controls the excessive retraction of the retraction portion when the shaft unit of the mandrel is gripped and retracted, and prevents the retraction portion from excessively moving forward beyond the home position by the clutch.

BACKGROUND OF THE INVENTION

The blind rivet consists of a mandrel and a rivet main body, the rivet main body comprising a hollow cylindrical sleeve and a large diameter flange formed at one end of the cylindrical sleeve. The mandrel is composed of an elongated shaft unit and a mandrel head formed at one end unit of the shaft unit and has a diameter larger than the inner diameter of the cylindrical sleeve. The shaft unit of the mandrel is inserted from one end of the cylindrical sleeve of the rivet main body so that the mandrel head abuts one end unit of the cylindrical sleeve, and the mandrel shaft unit is combined in order to extend longwise from the flange. The blind rivet is held by the blind rivet fastening device such that the part to be gripped by the mandrel shaft part is inserted into the nose of the blind rivet fastening device, and the flange of the rivet main body is in contact with the nose. With the blind rivet held by the blind rivet fastening device, the sleeve of the rivet main body is inserted into the mounting hole of the fastened member, and the flange is brought into contact with the fastened member.

Next, the mandrel shaft unit is strongly pulled out by the operation of the retracting unit of the blind rivet fastening device, the mandrel head deforms a part of the sleeve to expand its diameter, and between the sleeve portion—the diameter of which is expanded and deformed—and the flange, the fastened member is securely clamped. The mandrel is broken by a small diameter breakable unit formed in the mandrel shaft unit, and the rivet main body is fastened to the fastened member. In the case where the fastened member is a vehicle body panel and a component to be attached to the vehicle body panel, the blind rivet is fastened to both members in a state in which the attachment portion of the component is overlapped on the vehicle body panel. In this way, parts are fixated to the vehicle body panel. The blind rivet has an advantage in that fastening work can be performed from one side, even if it is a panel with a large area such as a body panel as the fastened member. Generally, the blind rivet is made of a metal material such as steel or aluminum. After fastening, it is necessary to recover the shaft unit of the broken mandrel of the blind rivet from the blind rivet fastening device.

Japanese Unexamined Patent Publication No. 2013-248643 discloses a blind rivet fastening device using an electric motor driven by a battery. With the blind rivet fastening device, a recovery container for the mandrel is provided axially forwardly of the electric motor. When the electric motor rotates, the power of the electric motor passes through the second shaft below the collection container and is transmitted to the spindle in front of the rotating container. The axial position of the pulling head is determined by detecting the rotational speed of the electric motor.

A first clutch is equipped, comprised of a nut clutch having a segment unit and a spindle clutch having a segment unit of a complementary shape. When the electric motor rotates in the forward direction and the pulling head reaches the rear end unit, the segment unit of the nut clutch releases from the segment unit of the spindle clutch, preventing excessive retraction of the pulling head. In addition, a second clutch is equipped, comprised of a rear clutch having saw teeth composed of an inclined plane and a vertical plane, and a front clutch having saw teeth meshing thereto. When the electric motor rotates in the reverse direction and the pulling head reaches the home position, the inclined faces of the saw teeth slip with each other and the pulling head is prevented from leaving the home position in the forward direction.

The blind rivet fastening device of Patent Document 1 is equipped with two clutches in the axial direction; the clutch of one in Reference Number YZA-0569, Application No. 2016-217049 (Proof) Submission Date: 7 Nov. 2016, has two respective members, so that the number of parts increases. In addition, a disadvantage has been that the length in the axial direction is extended. Also, when a foreign object was caught between the pulling head and the nosepiece, the front clutch has been unable to return to the home position, so the space for the rear clutch to slip has not been securable and the second clutch has not operated properly, which has been problematic. Since the second clutch was positioned closer to the pulling head side than the ball screw shaft, the ball screw shaft tried to move the pulling head to the home position even if the second clutch did not operate properly. As a result, abnormal pressure was applied to the pulling head, threatening to destroy the nose.

Japanese Patent Publication No. 58-43229 discloses a power coupling tool for attaching a fastener (blind nut) to a panel member. The power tightening tool comprises a drive shaft, a nut member connected to the drive shaft, a tension shaft engaged in a threaded manner with the nut member and extending toward the front of the tool, and a mandrel connected to the tip of the tension shaft and having a female screw at the tip. The drive shaft and the nut member are connected by a first clutch, and when the rotational static torque of a certain level or more is applied during forward rotation, the drive shaft and the nut member are slidably engaged. When the engagement is completed, the rotational static torque increases, and a click sound is generated, whereby the worker will know the engagement is completed.

After the engagement is completed, the motor is rotated in reverse while the tool is pressed against the panel member. The nut member rotates in the reverse direction, and the tension shaft and the mandrel return to the forward position. The second clutch slips and engages when a certain amount of torque is applied during reverse rotation. At this time, a click sound is generated, the worker releases pressing the tool against the panel member, removes the mandrel from the fastening tool and stops driving the motor.

In the power clamping tool of Patent Document 2, the first clutch slips when a torque greater than a certain level is applied during forward rotation, and the second clutch slides when a torque greater than a certain level is applied during reverse rotation. Similarly to the blind rivet fastening device of Patent Document 1, since the power coupling tool of Patent Document 2 is equipped with two clutches in the axial direction, the number of parts increases. In addition, a disadvantage is that the length in the axial direction becomes greater.

Therefore, there has been a demand for a blind rivet fastening device which is small in number, short in axial length, compact and lightweight.

BRIEF SUMMARY OF THE INVENTION

One object of the present invention is to provide a compact blind rivet fastening device with few parts. More specifically, a blind rivet fastening device is provided that performs the function of a first clutch that prevents excessive retraction of the pulling head and a second clutch that prevents the pulling head from moving forward beyond the home position with one clutch. Another object of the present invention is to provide a blind rivet fastening device in which a clutch operates normally even when foreign matter is caught between the pulling head and the nosepiece. More specifically, a blind rivet fastening device is provided wherein, in the case where the function of the second clutch for preventing the pulling head from moving forward of the home position is provided between the ball screw nut and the spindle, and the ball screw shaft cannot move forward due to abnormality, the second clutch works to stop the forward movement of the ball screw shaft and prevent the nose from being destroyed.

One aspect of the present invention is a blind rivet fastening device for fastening a blind rivet including a mandrel and a rivet main body to a member to be attached. The fastening device includes: an electric motor disposed at the rear end unit; a power transmission unit that transmits rotation of the electric motor; a spindle that is disposed in front of the electric motor and that is rotated by power transmitted by the power transmission unit; a ball screw nut which is adjacent to the spindle and which is connected to the spindle and rotates; a ball screw shaft provided at a central portion of the ball screw nut that moves in the axial direction by rotation of the ball screw nut; a retracting unit connected to the ball screw shaft and configured to grasp and retract the shaft unit of the mandrel; a position detection mechanism for detecting a position in the axial direction of the retracting unit, a trigger provided in the handle portion; a control unit that controls forward rotation, reverse rotation and stop of the electric motor according to the pulling operation of the trigger and the position of the retracting unit detected by the position detection mechanism; a spindle clutch having a cylindrical unit and a flange unit at one end of the cylindrical unit, wherein a plurality of first segment units are formed on a front plane of the flange unit, the cylindrical unit is housed in a spindle cylindrical unit of the spindle, and the spindle clutch rotates integrally with the spindle; and a nut clutch having a plurality of second segment units complementary in shape to the first segment unit of the spindle clutch, integrally formed with the ball screw nut.

When equipped with a spindle clutch having a cylindrical unit and a flange unit, wherein a plurality of first segment units are formed in the flange unit, the spindle clutch being axially movable with respect to the spindle and rotating integrally with the spindle; as well as a nut clutch having a plurality of second segment units complementary in shape to the first segment unit of the spindle clutch, that is integrated with the ball screw nut; it is possible to easily release the engagement between the spindle clutch and the nut clutch.

As a result, even if the spindle continues to rotate at the rear end position, the ball screw nut can stop the rearward movement.

The spindle clutch has a convex unit protruding radially outward of the first segment unit, the convex unit is accommodated in an axially extending slot formed in the spindle cylindrical unit of the spindle, and the spindle clutch is preferably held so that it is movable in the axial direction with respect to the spindle but not rotated.

When the spindle clutch has a convex unit projecting radially outwardly of the first segment unit and the convex unit is accommodated in the axially extending slot formed in the spindle cylindrical unit of the spindle, the spindle clutch is held so that it is movable in the axial direction with respect to the spindle but not rotated, it rotates integrally with the spindle, and is capable of moving in the axial direction to release of the clutch.

When there is a tail cap of a ring shape connected to the rear end unit of the ball screw shaft, the spindle clutch has a step unit at the rear end unit to which the tail cap can be engaged, and the ball screw shaft moves rearward, it is preferable for the tail cap to push the step unit of the spindle clutch rearward so that the engagement between the spindle clutch and the nut clutch is released.

When there is a tail cap of a ring shape connected to the rear end unit of the ball screw shaft, and the spindle clutch has a step unit at the rear end unit, the ball screw shaft retracts and the tail cap pushes the step unit so that the engagement of the spindle clutch, and the nut clutch can be easily released.

It is preferable for there to be a tail shaft that does not move in the axial direction behind the ball screw shaft and that has a flange-like tail flange formed at the rear end unit thereof, and a spindle clutch spring arranged between the tail flange and the rear end unit of the spindle clutch.

When there is a tail shaft that cannot move in the axial direction, a tail flange of a flange shape is formed at the rear end unit of the tail shaft, and there is a spindle clutch spring for pressing the spindle clutch forward relative to the tail flange; in the normal state, the spindle clutch spring presses the spindle clutch forward, and it is possible to maintain the state of engagement with the nut clutch.

With the first segment portion of the spindle clutch, it is preferable for one end unit of the circumferential direction to be perpendicular to the end plane of the spindle clutch, and for the other end unit to be a first inclined plane inclined with respect to the end plane of the spindle clutch.

When the first segment portion of the spindle clutch is a first vertical plane of which one end unit in the circumferential direction is perpendicular to the end plane of the spindle clutch and of which the other end unit is a first inclined plane inclined with respect to the end face of the spindle clutch, when transmitting power by the first vertical plane, power can be transmitted without slipping; and when transmitting power by the first inclined plane, when excessive force is applied, it is capable of slipping and releasing the engagement.

It is preferable for the second segment portion of the nut clutch to be a second vertical plane whose one end unit in the circumferential direction is perpendicular to the end plane of the nut clutch, and the other end unit is inclined with respect to the end plane of the nut clutch, the second vertical plane of the second segment unit of the nut clutch to be engageable with the first vertical plane of the first segment unit of the spindle clutch, and the second inclined plane of the second segment unit of the nut clutch to be engageable with the first inclined plane of the first segment unit of the spindle clutch.

When the second vertical plane of the second segment unit of the nut clutch engages the first vertical plane of the first segment unit of the spindle clutch and the second inclined plane of the second segment unit of the nut clutch engages the first inclined plane of the first segment unit of the spindle clutch, when the nut clutch and the spindle clutch are rotated in the forward direction and the retracting unit retracts in the mandrel shaft unit, the first vertical plane can strongly transmit the power to the second vertical plane. Further, when the nut clutch and the spindle clutch rotate in the reverse direction and the retracting unit returns to the home position, the first inclined plane transmits the power to the second inclined plane; and when strong force is applied, the inclined planes mutually slip.

It is preferable that, when the resistance is increased in the axial forward direction of the ball screw shaft and the ball screw nut is not able to rotate, the first inclined plane of the first segment unit of the spindle clutch slips from the second inclined plane of the second segment unit of the nut clutch, and the spindle clutch moves rearward.

Even if the ball screw shaft reversely rotates, the ball screw shaft reaches the front end unit and the rotational resistance of the ball screw nut increases, the spindle clutch slips relative to the nut clutch integral with the ball screw nut, so that the spindle continues to rotate. In addition, even when a foreign object gets caught and the ball screw nut cannot rotate, the clutch slips, and it can be protected so as not to break the device.

A nosepiece is equipped on the tip portion having an opening portion through which the shaft unit of the mandrel passes; the retracting unit preferably has a jaw case with a pulling head that moves in the axial direction by the axial movement of the ball screw shaft, and an inner circumferential plane positioned integrally with the pulling head adjacent to the pulling head the inner diameter of which decreases toward the front end; and an outer circumferential plane positioned within the jaw case and abutting against the inner circumferential plane of the jaw case.

The device is provided with a nosepiece at its tip; when the retracting unit has a pulling head, a jaw case having an inner peripheral plane whose inner diameter decreases toward the front end, and a jaw positioned within the jaw case and abutting the inner peripheral plane of the jaw case, when pulling the jaw case rearward, the mandrel shaft unit can be grasped and pulled out with the jaw.

It is preferable for the power transmission unit to have a motor gear coupled to the electric motor, a rear gear provided below the motor gear and engaged with the motor gear, a spindle gear coupled to the spindle, a front gear provided below the spindle gear and engaged with the spindle gear, and a second shaft provided under the recovery container, integrally connecting the rear gear and the front gear.

Power can be transmitted by bypassing the recovering device of the broken mandrel shaft unit by a power transmission path passing through the rear gear, the second shaft and the front gear.

It is preferable for the position detection mechanism to comprise a rotation number detecting element for detecting the number of rotations of the electric motor. If the position detection mechanism comprises a rotation number detecting element for detecting the number of rotations of the electric motor, it is possible to easily determine the axial position of the printing head.

Another aspect of the present invention is a clutch device used for releasing the transmission of rotation from a spindle of a blind rivet fastening device to a ball screw nut; equipped with a spindle clutch having a cylindrical unit and a flange unit at one end of the cylindrical unit, wherein a plurality of first segment units are formed on a front plane of the flange unit, the cylindrical unit is accommodated in a spindle cylindrical unit of the spindle, the spindle clutch axially movable with respect to the spindle and rotating integrally with the spindle; and a nut clutch integrally formed on a rear plane of the ball screw nut.

A clutch device equipped with a spindle clutch integrally rotating with a spindle, and a nut clutch integrally formed on a rear plane of the ball screw nut; wherein, when the cylindrical unit of the spindle clutch is accommodated in the spindle cylindrical unit of the spindle, the spindle clutch can easily be moved in the axial direction and can easily release the nut clutch.

It is preferable for the spindle clutch to have a convex unit protruding radially outward of the first segment unit so as to hold the spindle clutch so as not to rotate with respect to the spindle.

When the spindle clutch has a convex unit protruding radially outward of the first segment unit, the spindle clutch is rotationally stopped with respect to the spindle and rotated integrally with the spindle by accommodating the convex unit in the slot formed in the spindle cylindrical unit of the spindle.

Yet another aspect of the present invention is a spindle clutch device used for releasing the transmission of rotation from a spindle of a blind rivet fastening device to a ball screw nut that is axially movable with respect to the spindle and rotates integrally with the spindle; having a cylindrical unit and a flange unit at one end of the cylindrical unit; wherein a plurality of first segment units are formed on a front plane of the flange unit; the first segment unit is a first vertical plane whose one end unit in the circumferential direction is perpendicular to the end plane of the spindle clutch and other end unit is inclined with respect to the end plane of the spindle clutch; and it has a convex unit protruding radially outward of the first segment unit so as to hold [the spindle clutch] so as not to rotate with respect to the spindle.

According to the present invention, it is possible to provide a compact blind rivet fastening device with few parts. More specifically, according to the present invention, it is possible to provide a compact blind rivet fastening device that performs the function of a first clutch that prevents excessive retraction of the pulling head and a second clutch that prevents the pulling head from moving forward beyond the home position with one clutch. According to the present invention, since the clutch device is located closer to the spindle than the ball screw shaft, even when foreign matter and the like gets caught, progress of the ball screw shaft is stopped, and the fastening device is protected against breakage. More specifically, according to the present invention, it is possible to provide a blind rivet fastening device that protects a device from being broken by slipping of a clutch even when the ball screw nut cannot be rotated due to catching a foreign object, or the like.

DETAILED DESCRIPTION OF THE INVENTION

Figure 1:
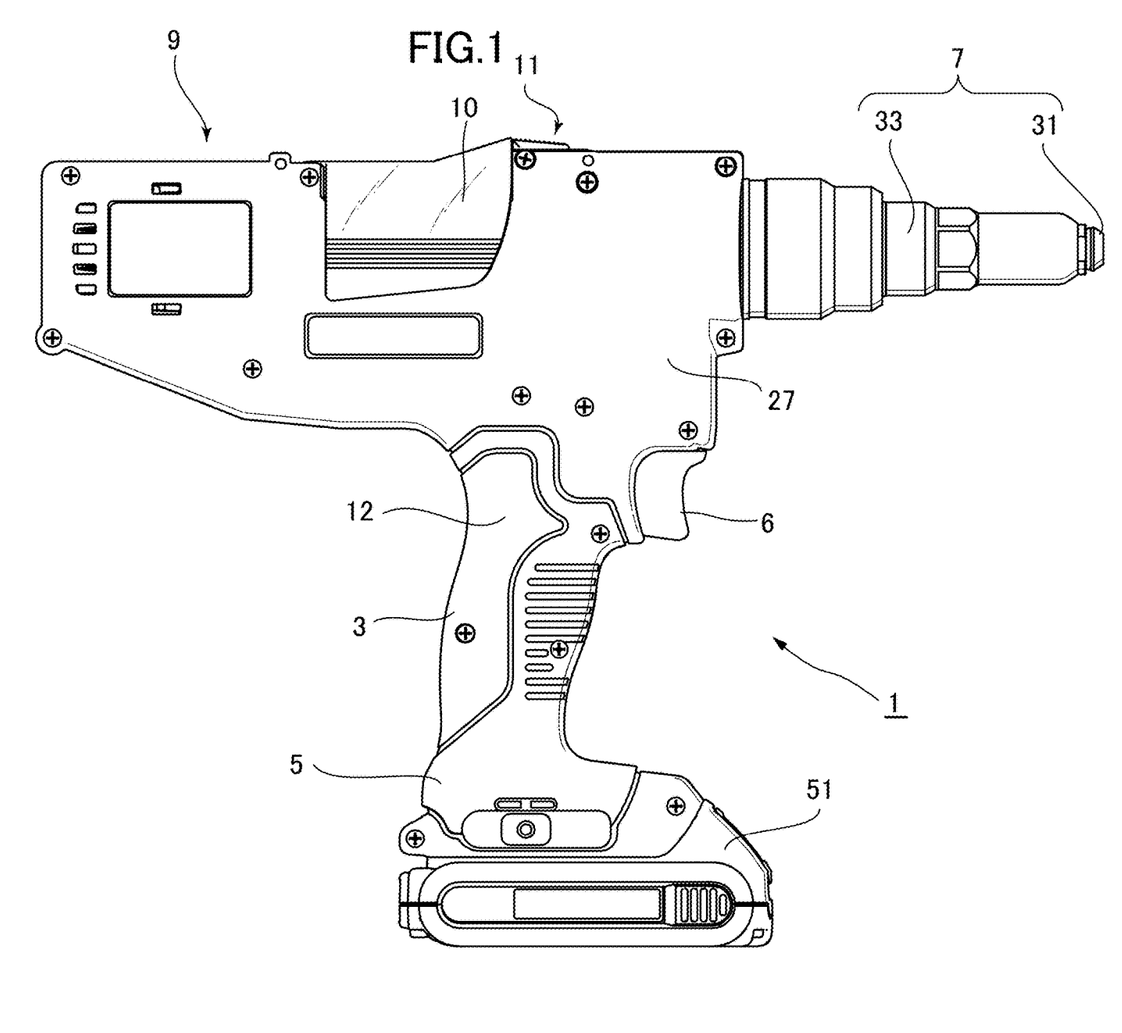
FIG. 1 is a front view of an electric blind rivet fastening device according to the first embodiment of the present invention

A first embodiment of an electric blind rivet fastening device according to the present invention will be now be described below with reference to the drawings. FIG. 1 is a front view of an electric blind rivet fastening device according to the first embodiment of the present invention. The electric blind rivet fastening device 1 is equipped with a blind rivet fastening mechanism housed in a substantially cylindrical housing and a handle 3 extending substantially vertically from the intermediate position of the fastening mechanism. A battery 51 is detachably attached to the battery holding unit 5 at a lower portion of the handle 3. A trigger 6 is provided on the upper part of the handle 3. When a worker pulls the trigger 6, the retracting unit performs fastening operation of the blind rivet, and when the pulling operation of the trigger 6 is released, the retracting unit returns to the home position HP (front end position), and the fastening operation is released (or stopped).

The blind rivet fastening mechanism comprises a nose 7 on the front side (right side in FIG. 1), a motor unit 9 on the rear side (left side in FIG. 1), and a power transmission unit 11 in the center part. An electric motor 13 composed of a brushless motor is housed in the motor unit 9. The power transmission unit 11 transmits the rotation of the electric motor 13 to the spindle 14. The nose 7 is provided with a retracting unit for grasping and retracting in the mandrel shaft unit of the blind rivet. The handle 3 is provided with a control unit 12.

Figure 2:
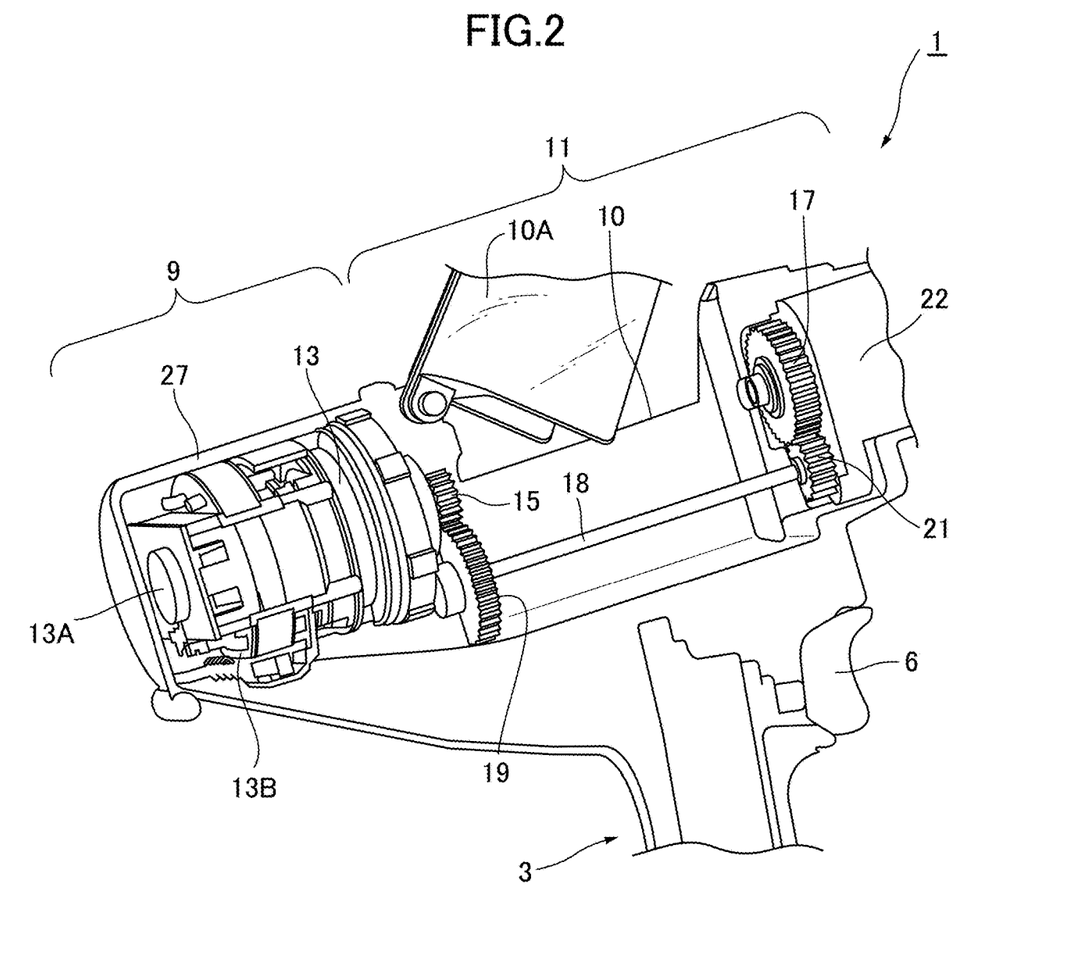
FIG. 2 is a perspective view of a motor unit and a part of the power transmission portion that was broken of the blind rivet fastening device of FIG. 1.

FIG. 2 is a perspective view of a motor unit and a part of the power transmission portion that was broken of the blind rivet fastening device of FIG. 1. First, the rear motor section 9 will be described. In the present invention, the electric motor 13 is a brushless motor. In the brushless motor, the rotor is a magnet and the winding circuit is on the stator side. The rotation angle of the rotor is detected by a Hall element (magnetic sensor) 13A incorporated in the electric motor 13. The electronic circuit 13B for the brushless motor performs switching at the timing matched with the magnetic poles of the rotor. By detecting the number of rotations of the rotor of the brushless motor, the position in the axial direction of the retracting unit can be obtained.

Known elements other than the Hall element 13A may be used for detecting the rotation of the rotor. Since the brushless motor is well known, it will not be discussed in further detail. As a position detection mechanism for obtaining the position in the axial direction of the retracting unit, a position detection mechanism other than for detecting the number of rotations of the rotor of the motor can be used. For example, the axial position may be directly detected in the pulling head 28 of the retracting unit. In addition, a planetary gear may be provided to reduce the number of rotations of the electric motor 13 for transmission to the power transmission unit 11.

Between the nose 7 and the motor part 9, on the upper part of the handle 3, a recovery container 10 of the broken mandrel shaft unit is provided. The recovery container 10 is formed in a semicircular cylindrical shape, and a transparent or translucent cover 10A surrounds the upper portion. Through the cover 10A, the housed broken mandrel shaft unit can be seen from the outside. The cover 10A can be opened and closed so that the broken mandrel shaft unit can be discarded.

The handle 3 extends diagonally downward from the bottom of this recovery container 10. Since the recovery container 10 is arranged in the middle of the tool housing 27, the operator can stably hold the handle 3.

A power transmission unit 11 is provided between the motor unit 9 and the nose 7. The power transmission unit 11 bypasses the recovery container 10 and transmits the rotational force (torque) of the electric motor 13 of the motor unit 9 to the spindle 14 in the gear housing 22. The power transmission unit 11 includes a motor gear 15, a rear gear 19, a second shaft 18, a front gear 21 and a spindle gear 17.

A motor gear 15 connected to the motor shaft of the electric motor 13 is disposed on the rear side of the recovery container 10, and on the front side of the recovery container 10, a spindle gear 17 connected to a spindle 14 having an axis coaxial with the axis of the motor shaft is disposed.

Between the motor gear 15 and the spindle gear 17, a second shaft 18 is provided in a space below the recovery container 10. The second shaft 18 is supported so as to be rotatable about an axis in a direction parallel to the motor shaft of the electric motor 13 and the axis line of the spindle 14. A rear gear 19 engaging with the motor gear 15 is attached to the rear end of the second shaft 18, and a front gear 21 engaging with the spindle gear 17 is attached to the front end of the second shaft 18. The second shaft 18 is a single shaft and connects the rear gear 19 and the front gear 21. The second shaft 18, the front gear 21 and the like are accommodated in the tool housing 27.

Since the rear gear 19 is engaged with the motor gear 15, when the electric motor 13 rotates in the forward direction, the second shaft 18 rotates in the opposite direction. Since the front gear 21 is engaged with the spindle gear 17, when the second shaft 18 rotates in the reverse direction, the spindle gear 17 rotates forward and the spindle 14 rotates in the forward direction. As a result, the spindle 14 rotates in the same direction as the electric motor 13. In this way, the rotation of the electric motor 13 is transmitted to the spindle 14 via the second shaft 18. The gear ratio of the motor gear 15 and the rear gear 19 and the gear ratio of the front gear 21 and the spindle gear 17 are arbitrarily determined by the balance between the output of the electric motor 13 and the fastening force of the blind rivet.

Further, the handle 3 is provided with a control unit 12. The control unit 12 controls the rotation of the electric motor 13 by the axial position of the retracting unit, the pulling operation of the trigger and the releasing operation thereof, so as to control the forward and reverse movement of the pulling head 28 of the retracting unit via the rotation of spindle 14. In response to the operation of the trigger 6, the control unit 12 controls the electric motor 13 so as to retract the pulling head 28 of the retracting unit from the home position HP to the rear end position RP, and stop at its rear end position RP. The rear end position RP is a position slightly behind the position where the mandrel shaft unit is broken. By releasing the pulling operation of the trigger 6, the pulling head 28 is advanced from the rear end compact RP, returned to the home position HP at the front end position, and stopped at the home position HP. Although the home position HP and the rear end position RP are described as the axial position of the pulling head 28, there are also the home position HP and the rear end position RP corresponding to the ball screw shaft 36, the jaw case 32 and the jaw 29 of the retracting unit.

Figure 3:
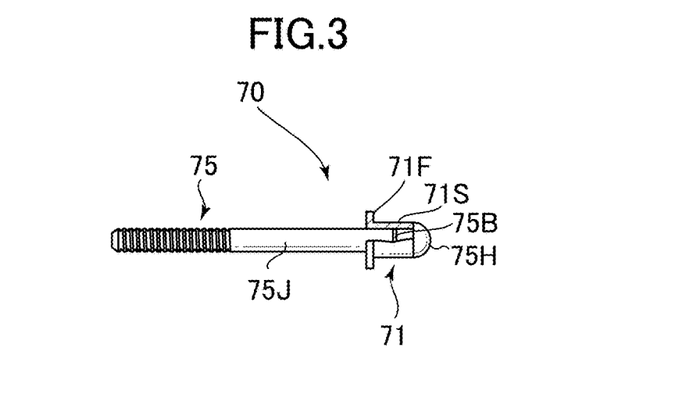
FIG. 3 is a front view of a part that was broken of the rivet main body of a blind rivet comprising a rivet main body and a mandrel.

We shall now describe the blind rivet 70 to be fastened by the blind rivet fastening device. FIG. 3 is a front view of a part that was broken of the rivet main body of a blind rivet comprising a rivet main body and a mandrel. The blind rivet 70 is composed of a rivet main body 71 and a mandrel 75. The rivet main body 71 is composed of a cylindrical sleeve 71S and a flange 71F having a larger diameter than the sleeve 71S formed at one end of the sleeve 71S. The mandrel 75 comprises an elongated bar-like mandrel shaft unit 75J and a mandrel head 75H formed at one end unit of the mandrel shaft unit 75J. The outer diameter of the mandrel head 75H is formed to be larger than the inner diameter of the sleeve 71S. A breakable unit 75B is formed near the mandrel head 75H of the mandrel shaft unit 75J.

As the mandrel shaft unit 75J of the mandrel 75 is inserted from the sleeve 75S side of the rivet main body 71, the mandrel shaft unit 75J extends from the side of the flange 71 F of the sleeve 71S, the end face of the mandrel head 75H comes into contact with the end face of the sleeve 71S of the rivet main body 71 and stops. The blind rivet 70 assembled in this manner is inserted into the nosepiece 31 of the blind rivet fastening device 1 with the end unit of the mandrel shaft unit 75J at the head. A part of the mandrel shaft unit 75J is inserted into the nosepiece 31 of the blind rivet fastening device 1, the end face of the flange 71F abuts the nosepiece 31, and in a state wherein the rivet main body 71 and the mandrel head 75H project from the nosepiece 71, the blind rivet 70 is held by the blind rivet fastening device 1.

The blind rivet 70 held by the blind rivet fastening device 1 is inserted into the attachment hole of the fastened member until the sleeve 71S of the rivet main body 71 comes in contact with the fastened member such as the vehicle body panel and the attachment part. Next, the mandrel shaft unit 75J is strongly pulled out by the blind rivet fastening device 1, a part of the sleeve 71S of the rivet main body 71 is expanded in diameter by the mandrel head 75H, and the fastened member is strongly sandwiched between the expanded portion of the sleeve [sic] 71S and the flange 71F. The mandrel shaft unit 75J breaks at the breakable unit 75B, and the blind rivet 70 is fastened to the fastened member. Generally, the blind rivet is made of a metal material such as steel or aluminum. In the blind rivet after fastening, the broken mandrel shaft unit needs to be collected.

Figure 4:
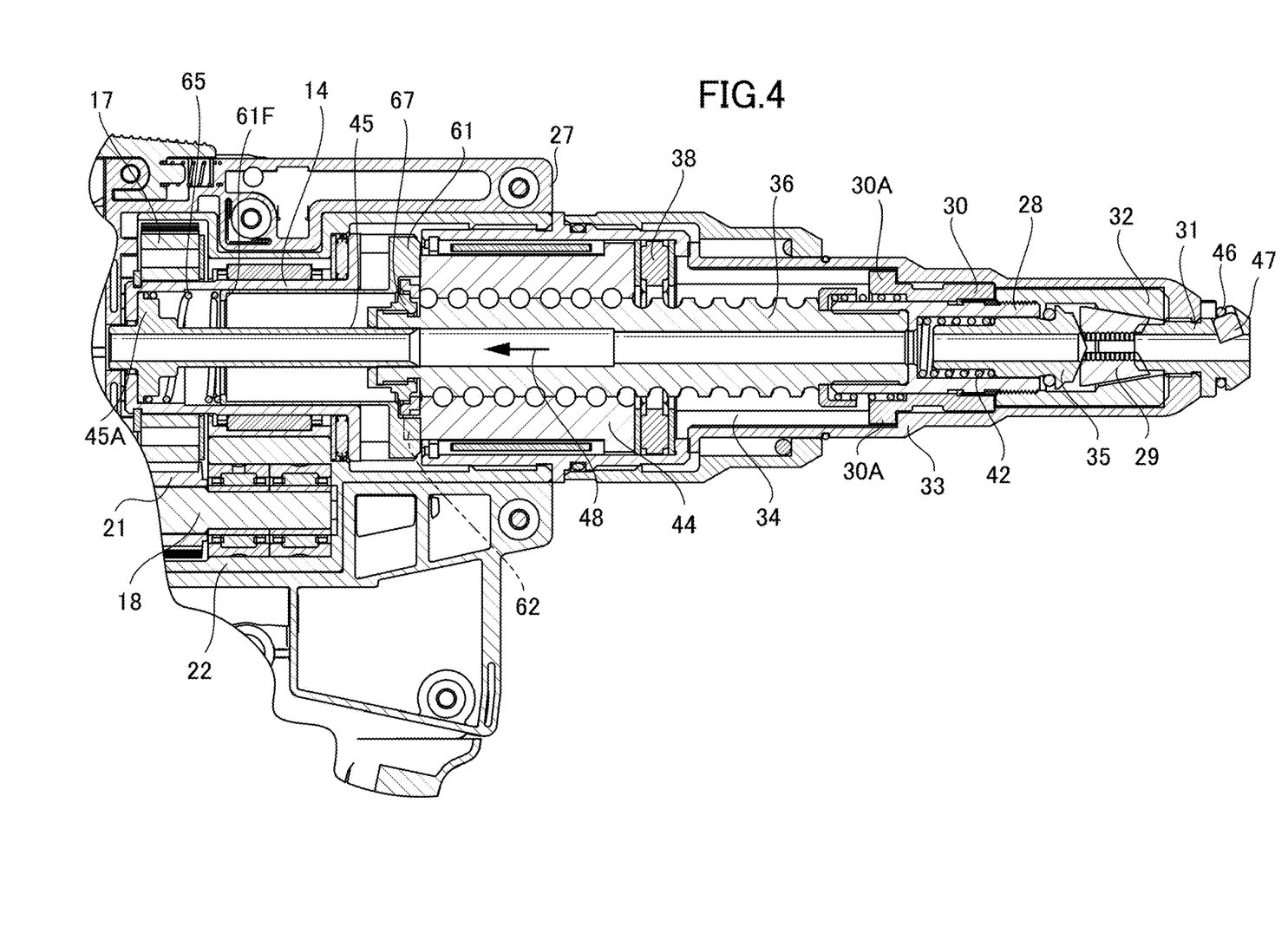
FIG. 4 is a longitudinal sectional view from the spindle to the nose of the blind rivet fastening device of FIG. 1.

With reference to FIG. 4, we shall now describe the structure and operation of the retracting part contained in the nose 7 in front of the device. FIG. 4 is a vertical cross-sectional view of the power transmission portion 11 and of the area from the spindle 14 to the nose 7 of the fastening mechanism of the blind rivet fastening device of FIG. 1. The nose 7 is in front of the power transmission unit 11.

We shall now describe the member disposed in front of the nose 7. The nose 7 has a nosepiece 31 at the tip and a cylindrical nose housing 33 extending from the nosepiece 31 to the tool housing 27 at the rear. The nosepiece 31 is substantially cylindrical; the distal end unit has a large outer diameter and is arranged so that the distal end unit abuts against the opening of the nose housing 33. The nosepiece 31 can receive the mandrel shaft unit 75J of the mandrel 75 at the opening.

At the opening of the nosepiece 31, the pin 47 is arranged to slightly enter the hollow passageway of the axial center. An O-ring 46 is arranged around the nosepiece 31. The pin 47 is pressed by the O-ring 46, and the tip portion of the pin 47 protrudes into the hollow passage of the nosepiece 31 so that a part of the hollow passage narrows. As a result, when inserting the mandrel shaft unit 75J of the blind rivet 70 into the hollow passage, the mandrel 75 can be pressed and can be pushed into the hollow passage, and the blind rivet 70 is held at the tip of the nosepiece 31. The broken mandrel shaft unit 75J strikes the tip portion of the pin 47 so that it cannot be discharged to the outside from the hollow passage of the nosepiece 31.

A hollow passage is formed in the axial center portion of the nose housing 33. The jaw 29 receives and holds the mandrel 75 of the blind rivet 70 and fastens the blind rivet 70; the broken mandrel shaft unit 75J is then sent to the collection container 10 through the hollow passage. A retracting unit for retracting the mandrel shaft unit 75J is disposed at the tip portion inside the nose 7. The retracting unit includes a jaw 29 for grasping the mandrel shaft unit 75J, a jaw case 32 surrounding jaw 29, a pulling head 28 which is integral with the jaw case 32 and is movable in the axial direction so as to retract the jaw 29 toward the rear side, and a jaw case lock 30 arranged around the pulling head.

On the inside of the nose housing 33, a substantially cylindrical pulling head 28 is positioned, and a jaw case lock 30 is arranged on the outside thereof. The jaw case lock 30 is provided with a convex unit 30A at a position facing in the radial direction. The convex unit 30A is arranged so as to be movable along a groove extending in the axial direction of the mast housing 34. Therefore, the jaw case lock 30 and the pulling head 28 are held so that they cannot rotate with respect to the nose housing 33 but can move in the axial direction.

A jaw case 32 is provided adjacent to the distal end side of the pulling head 28. The jaw case 32 is substantially cylindrical in shape, has a constant outside diameter and is slidable in the nose housing 33. The distal end side of the jaw case 32 gradually decreases in inner diameter and accommodates the jaw 29 inside. At the home position HP of the retracting unit, the front end unit of the jaw case 32 abuts against the inside of the nose housing 33.

The jaw 29 is divided into two to three pieces in the circumferential direction and is formed into a tapered shape toward the nosepiece 31. The jaw 29 is combined with a hollow cylindrical body whose axis is hollow and accommodated in the tapered cavity of the tubular jacket 32. Jaw 29 is pushed forward in tapered shaped jaw case 32 by jaw pusher 35 and jaw pusher spring 42. At the home position HP of the retracting unit, the tip of the jaw 29 abuts against the conical plane at the rear end of the nosepiece 31 and the conical plane of the nosepiece 31 and the conical plane of the tip of the jaw pusher 35 make jaw 2 9 open outward. The open jaw 29 receives the mandrel shaft unit 75J of the blind rivet 70 inserted from the nosepiece 31.

When the jaw case 32 is retracted rearward at the time the mandrel 75 of the plain rivet 70 is in the cavity of the jaw 29, the jaw 29 imparts a force in the direction of the central axis to the slope of the tapered portion. Therefore, the mandrel shaft unit 75J of the blind rivet 70 held in the cavity of the axial center of the jaw 29 is strongly gripped. The jaw 29 can be retracted from the home position HP at the front end to the rear end position RP and can be returned from the rear end position RP to the home position HP.

A hollow cylindrical jaw pusher 35 is disposed behind the jaw 29 inside the pulling head 28. Between the jaw pusher 35 and the pulling head 28, a jaw pusher spring 42 is arranged to push the jaw pusher 35 forward.

The pulling head 28 is integral with the jaw case 32 surrounding and supporting the jaw 29 and is arranged with its axis aligned with respect to the nose housing 33. The pulling head 28 and the jack case 32 are arranged so as to be slidable in the axial direction with respect to the nose housing 33.

The pulling head 28 is fixated to the ball screw shaft 36 behind it. The ball screw shaft 36 is a cylindrical member and extends in the axial direction inside the mast housing 34 fixated on the tool housing 27. A hollow passage is formed in the axial center of the ball screw shaft 36. A cylindrical tail shaft 45 narrower than the ball screw shaft 36 is disposed axially rearward of the ball screw shaft 36. The tail shaft 45 is a substantially cylindrical member extending rearward along the axial center portion of the spindle 14. A hollow passage is formed from the front end unit to the rear end unit of the tail shaft 45. A tail flange 45A having a large outer diameter is provided in a portion near the rear end of the tail shaft 45. The outer diameter of the tail flange 45A is equal to or slightly smaller than the inner diameter of the spindle cylindrical unit of the spindle 14, and abuts against the inner rear end unit of the spindle cylindrical unit.

The tail shaft 45 does not move in the axial direction but rotates integrally with the spindle 14. The ball screw shaft 36 is adapted to move the outer periphery of the tail shaft 45 in the axial direction. That is, when the ball screw shaft 36 moves rearward, the tail shaft 45 enters the hollow passage of the ball screw shaft 36. The ball screw shaft 36, the pulling head 28 and the jaw case 32 will reciprocate axially in a single body, pulling the jaw 29 rearwards of the nose 7 and returning it to the front of the nose 7.

As shown in FIG. 4, the respective axial center portions of the jaw 29, the jaw pusher 35, the pulling head 28, the ball screw shaft 36 and the tail shaft 45 are formed with a continuous hollow passage to the inlet of recovery container 10 from the inlet of nose 7. The mandrel shaft unit 75J is inserted into the axial center portion of the jaw 29 and the broken mandrel shaft unit 75J is fed into the recovery container 10 in the direction of the arrow 48 through the hollow passage. When the breakable mandrel shaft part is sent to the hollow passage one after another, the broken mandrel shaft part 75J pushes out the previously broken mandrel shaft part 75J, and the successively broken mandrel shaft parts 75J are sent.

Figure 5:
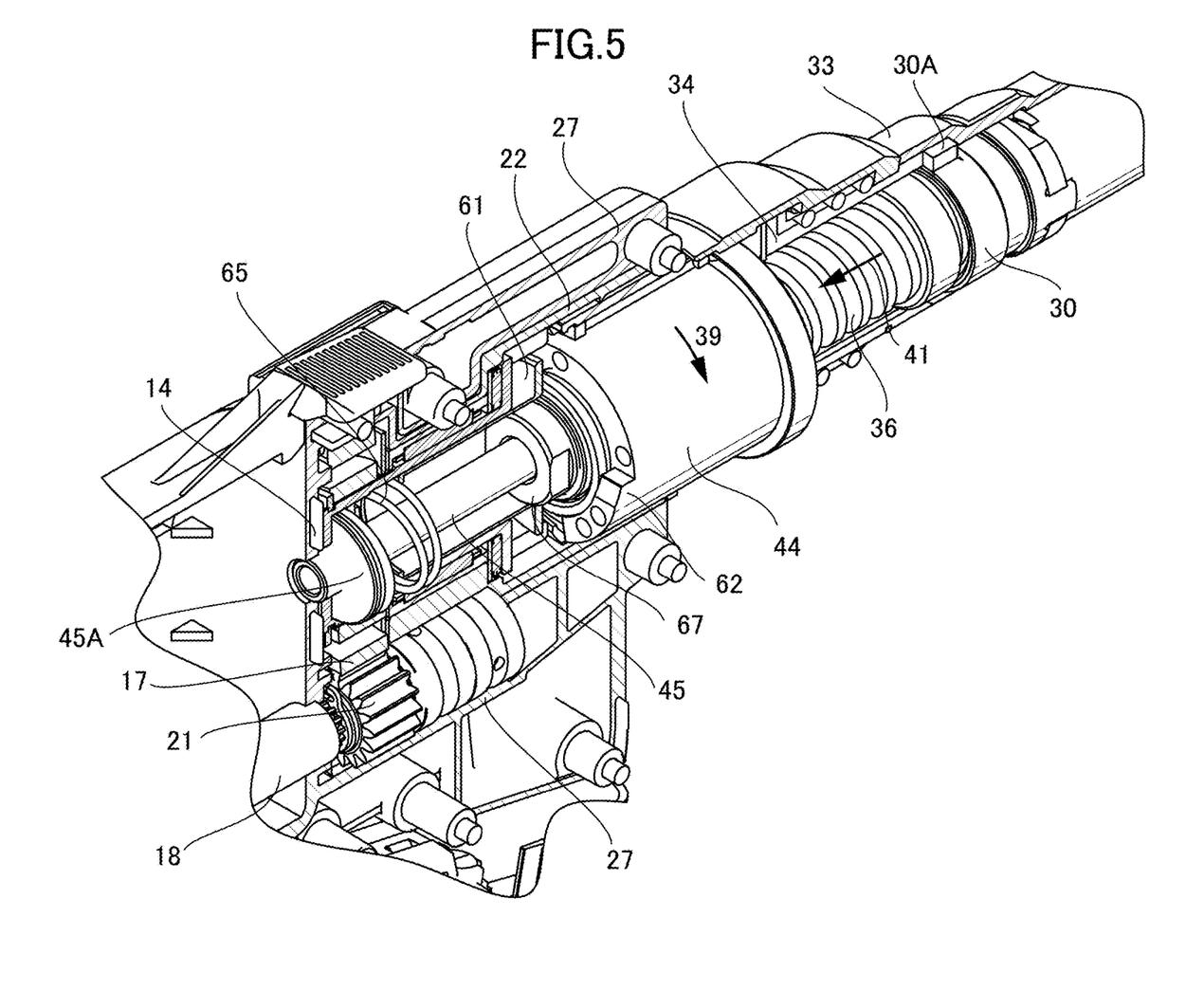
FIG. 5 is a perspective view of a part that was broken from the spindle to the pulling head of the blind rivet fastening device of FIG. 1.

We shall next describe a structure for transmitting power from the spindle 14 to the retracting unit. FIG. 5 is a perspective view from the spindle 14 to the retracted portion, showing the internal structure by removing part of the tool housing 27, the mast housing 34 and the nose housing 33. We shall now describe a structure in which the rotation is transmitted from the spindle 14 to the ball screw nut 44, and the ball screw shaft 36 moves in the axial direction by the rotation of the ball screw nut 44.

The spindle 14 has a substantially cylindrical spindle cylindrical unit and a spindle flange at the front end of the spindle cylindrical unit. The spindle 14 is connected to the ball screw nut 44 via a spindle clutch 61 and a nut clutch 62. The ball screw nut 44 is a substantially cylindrical member, and the ball screw shaft 36 is disposed on the axial center portion of the ball screw nut 44. An internal thread is formed in the ball screw nut 44. An external thread of the ball screw shaft 36 is engaged with this internal thread.

As shown in FIG. 4, a bearing 38 is disposed between the front end unit of the ball screw nut 44 and the mast housing 34, and the rotation resistance of the ball screw nut 44 is small.

The rotation of the spindle 14 is transmitted to the ball screw nut 44 via the spindle clutch 61 and the nut clutch 62. The ball screw nut 44 rotates but cannot move in the axial direction. Although the ball screw shaft 36 cannot rotate, it is supported so as to be movable in the axial direction. Since the inner screw of the ball screw nut 44 and the outer screw of the ball screw shaft 36 are screwed together, when the spindle 14 rotates in the forward direction, the ball screw nut 44 rotates in the normal direction and the ball screw shaft 36 moves straight rearward. Then, the pulling head 28 and the jaw case 32 of the retracting unit are retreated together, the mandrel shaft unit 75J of the blind rivet rib 70 is gripped by the jaw 29 and is pulled strongly rearward, and the plain rivet 70 is fastened.

When the spindle 14 rotates in the reverse direction, the ball screw nut 44 rotates in the reverse direction, and the ball screw shaft 36 linearly moves forward. The ball screw shaft 36, the pulling head 28 and the jaw case 32 advance together and return to the home position HP.

In the embodiment of the present invention, the pulling head 28 is controlled to move between the home position HP located at the front end and the rear end position RP. A spindle clutch 61 and a nut clutch 62 are provided in a portion between the spindle 14 and the ball screw nut 44. The spindle clutch 6 1 and the nut clutch 62 are collectively called a clutch device. When the pulling head 28 retreats to the rear end position RP, the spindle clutch 61 is pushed rearward, the engagement between the spindle clutch 61 and the nut clutch 62 is released, and the rotation is not transmitted to the ball screw nut 44 from the spindle 14. As a result, excessive pulling of the pulling head 28 is prevented.

As the pulling head 28 advances to the home position HP, the pulling head 28 will not advance further. Then, the spindle clutch 61 and the nut clutch 62 slip. Therefore, it is possible to prevent the pulling head 28 from projecting forward from the home position HP.

In addition, even if abnormal torque is applied due to some abnormality, for example, foreign matter becoming caught or the like before the pulling head 28 returns to the home position HP, the clutch slips so that no abnormal force is applied. Conventionally, the two functions of releasing the engagement of the clutch at the rear end position and sliding the clutch at the home position were performed by separate clutches. In the embodiment of the present invention, these two functions are performed by a clutch device comprising a pair of clutches, namely, a spindle clutch 61 and a nut clutch 62.

Figure 6:
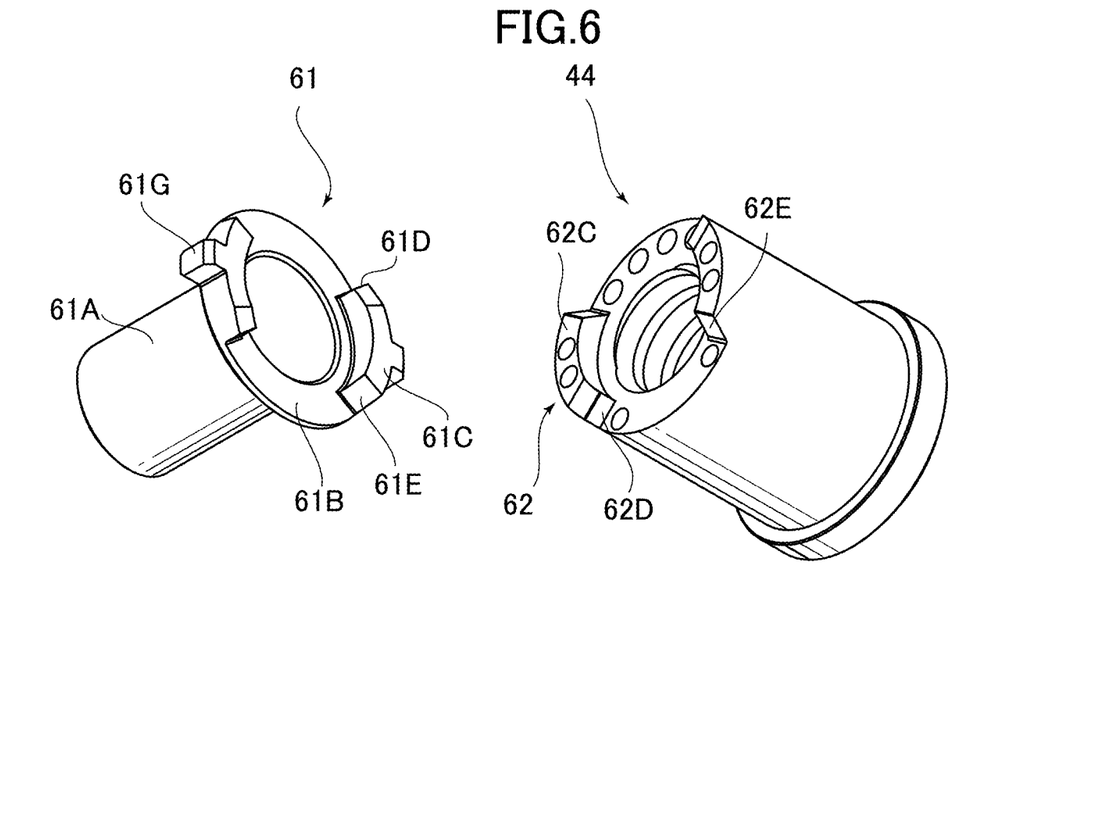
FIG. 6 is a perspective view of a spindle clutch and a nut clutch.
Figure 7:
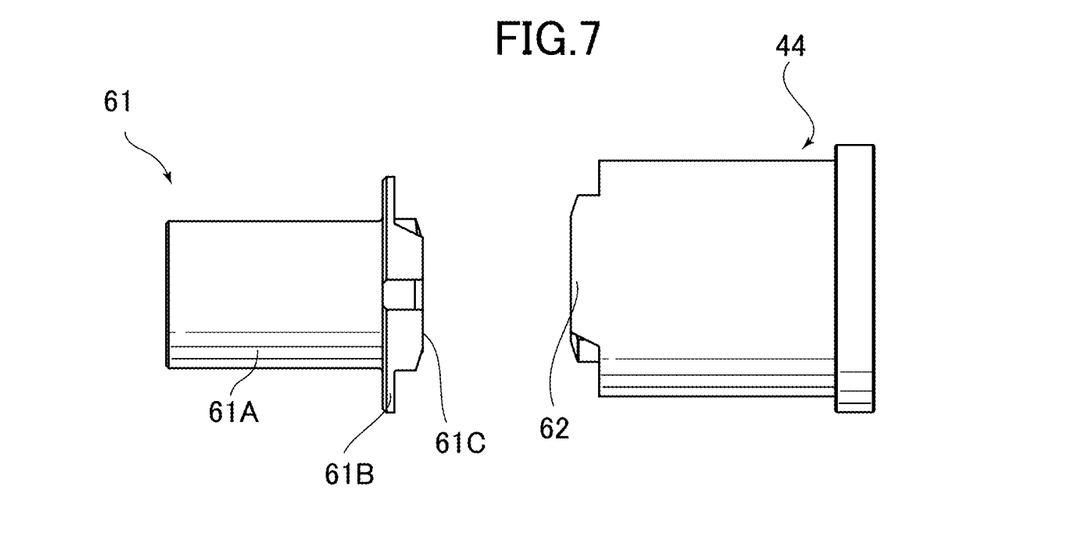
FIG. 7 is a front view of the spindle clutch and the nut clutch of FIG. 6.

We shall now describe a specific configuration of the clutch. FIG. 6 is a perspective view of the spindle clutch 61 and the nut clutch 62. FIG. 7 is a front view of the spindle clutch 61 and the nut clutch 62. As shown in FIG. 5, a spindle clutch 61 is disposed adjacent to the inside of the cylindrical spindle 14. A cylindrical unit 61A of the spindle clutch 61 is arranged inside the spindle cylindrical unit of the spindle 14. The spindle clutch 6 1 is movable axially with respect to the spindle 14. A flange unit 61B of the spindle clutch 61 is disposed slightly spaced forward from the spindle flange of the spindle 14.

The spindle clutch 61 has a cylindrical unit 61A of a cylindrical shape and a flange unit 61B at one end of the cylindrical unit 61A. A rear end unit 61F having a slightly smaller inner diameter than the inner diameter of the cylindrical unit 61A is formed at the opposite side end unit of the flange unit 61B of the cylindrical unit 61A of the spindle clutch 61. In the flange unit 61B, a first segment unit 61C which is one step higher in an arc shape having a constant width in the radial direction is formed. Two first segment units 61C are formed in opposing directions. The number of the first segment units 61C may be three or more. One end plane in the circumferential direction of the first segment unit 61C is the first vertical plane 61D perpendicular to the plane of the flange unit 61B and the other end plane is the first inclined plane 61E inclined with respect to the plane of the flange unit 61B.

A convex unit 61G that protrudes radially outward is formed in a part of the first segment unit 61C. The convex unit 61G is engaged with an axially extending slot (not shown) formed in the spindle 14. Therefore, although the spindle clutch 61 cannot rotate with respect to the spindle 14, it can slide in the axial direction. The spindle clutch 61 is pressed against the tail flange 45A in the direction of the nut clutch 62 by the spindle clutch spring 65.

A nut clutch 62 is integrally provided on the rear plane of the ball screw nut 44. The nut clutch 62 has a second segment portion 62C on the end plane of the ball screw nut 44, and this second segment portion 62C enters a part of the spindle clutch 61 which does not have the first segment portion 61C. That is, the first segment unit 61C of the spindle clutch 61 and the second segment unit 62C of the nut clutch 62 have complementary shapes. One end plane in the circumferential direction of the second segment unit 62C is a second vertical plane 62D perpendicular to the end plane of the ball screw nut 44, and the other end plane is a second inclined plane 62E inclined with respect to the plane of the flange unit 62.

The first vertical plane 61 D of the spindle clutch 61 can contact the second vertical plane 62D of the nut clutch 62. The first inclined plane 61E of the spindle clutch 61 can contact the second inclined plane 62E of the nut clutch 62. When the pulling head 28 is between the home position HP and the rear end position RP, the first segment unit 61C of the spindle clutch 61 and the second segment unit 62C of the nut clutch 62 mesh. The rotation of the spindle clutch 6 1 is transmitted to the nut clutch 62.

On the rear end unit of the ball screw shaft 36, a tail cap 67 is integrally provided. The tail cap 67 is a ring-shaped member surrounding the tail shaft 45. The outer diameter of the tail shaft 45 is equal to or slightly smaller than the inner diameter of the cylindrical unit 61A of the spindle clutch 61 and larger than the inner diameter of the rear end unit 61F of the spindle clutch 61. When the pulling head 28 moves rearward, the tail cap 67 also moves rearward integrally around the tail shaft 45. When the tail cap 67 reaches the rear end unit 61F of the spindle clutch 61, the inside of the rear end unit 61F is pushed rearward, and the spindle clutch 61 is moved rearward against the pressing force of the spindle clutch spring 65. As a result, the engagement between the first segment unit 61C of the spindle clutch 61 and the second segment unit 62C of the nut clutch 62 is released.

When pulling the trigger 6 with the pulling head 28 at the home position HP, the electric motor 13 rotates forward. The rotation of the electric motor 13 is transmitted to the spindle 14, and is transmitted from the spindle clutch 61 fixed integrally with the spindle 14 to the nut clutch 62 so that the ball screw nut 44 rotates in the forward direction (direction of arrow 39 in FIG. 5). When the electric motor 13 rotates forward, rotation is transmitted from the vertical plane 61D of the spindle clutch 61 to the second vertical plane 62D of the nut clutch 62, so that the clutch does not slip. The ball screw nut 44 integrated with the nut clutch 62 rotates. The ball screw shaft 36 moves in the direction of the arrow 41 (rearward). Before the pulling head 28 reaches the rear end position RP, the mandrel shaft unit 75J breaks at the breakable unit 75B.

When the pulling head 28 reaches the rear end position RP, the tail cap 67 integral with the ball screw shaft 36 hits the rear end unit 61F of the spindle clutch 61. The spindle clutch 61 is pushed by the tail cap 67 and moves in the direction of the arrow 41 against the pressing force of the spindle clutch spring 65. At the rear end position RP, the engagement between the spindle clutch 6 1 and the nut clutch 62 is released. The engagement between the spindle clutch 61 and the nut clutch 62 is released by disengagement of the first vertical plane 61D of the spindle clutch 61 and the second vertical plane 62D of the nut clutch 62; however, there is a continual state of being slipped by the slope adjacent to the first vertical plane 61D and the second vertical plane 62D. When the motor is rotated rearward in this state, the first inclined plane of the spindle clutch 61 and the second inclined plane of the nut clutch 62 are engaged, and the rotation is transmitted from the spindle 14 to the ball screw nut 44.

When the clutch is released, the retracting operation of pulling head 28 is stopped. At the rear end position RP, spindle 14 and spindle clutch 61 are controlled to rotate at a low speed. Because the engagement between spindle clutch 61 and nut clutch 62 is released, ball screw nut 44 does not rotate, and ball screw shaft 36 does not move rearward any further. Mandrel shaft unit 75J is not retracted any further. Alternatively, at the rear end position RP, spindle 14 and spindle clutch 61 may be designed not to rotate at a low speed, but to be controlled to stop.

When the pulling operation of trigger 6 is released with pulling head 28 positioned at the rear end position RP, electric motor 13 rotates in the reverse direction. Because first inclined surface 61E of spindle clutch 61 and second inclined surface 62E of nut clutch 62 are mutually engaged, the rotations of motor 13 are transmitted from spindle clutch 61 to nut clutch 62, ball screw nut 44 integrated with nut clutch 62 rotates in the reverse direction, ball screw shaft 36, tail cap 67, and spindle clutch 61 move forward. When electric motor 13 rotates in the reverse direction, the rotations are transmitted from first inclined surface 61E of spindle clutch 61 to second inclined surface 62E of nut clutch 62, and thus the clutch slips when a predetermined force or more is applied.

Pulling head 28 returns to home position HP; when ball screw shaft 36 reaches the front end thereof, and ball screw shaft 36 does not move forward any further. Because the rotational resistance of ball screw nut 44 increases, first inclined surface 61E of spindle clutch 61 and second inclined surface 62E of nut clutch 62 glide and slip. Spindle clutch 61 moves rearward against the force from spindle clutch spring 65.

When pulling head 28 returns to home position HP, spindle 14 is controlled to rotate slightly extra and stop. While the spindle 14 is rotating extra, spindle clutch 61 and nut clutch 62 slip, and ball screw nut 44 remains at home position HP.

In this way, it becomes possible to prevent pulling head 28 from protruding forward from home position HP. Alternatively, it is also possible to control the rotations of spindle 14 so as to be stopped, when pulling head 28 returns to the home position HP, and before spindle clutch 61 and nut clutch 62 slip.

By means of the axial position of pulling head 28, the pulling operation of trigger 6, and the releasing operation thereof, control unit 12 forwardly rotates electric motor 13, rotates it at a low speed, rotates it in the reverse direction, and stops it. When the motor shaft of electric motor 13 rotates forward, spindle 14 rotates in the forward direction around the axis. Ball screw nut 44 rotates forward, ball screw shaft 36 and pulling head 28 move rearward. When electric motor 13 rotates in the reverse direction, pulling head 28 moves forward.

Figure 8:
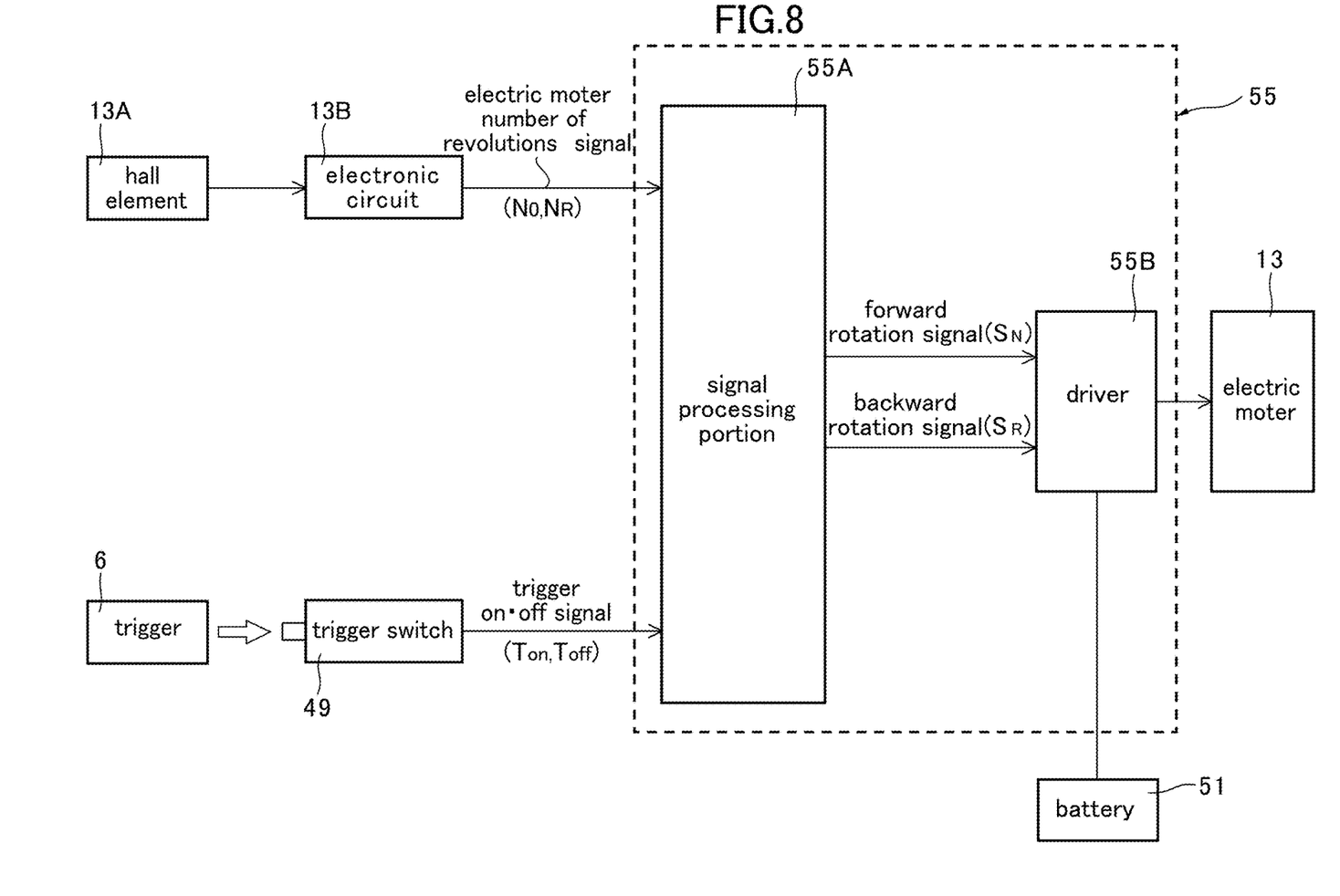
FIG. 8 is a block diagram of a control unit of the electric blind rivet fastening device of FIG. 1.

FIG. 8 is a block diagram of control unit 12. On/off signals T of trigger switch 49 are generated by the pull operation of trigger 6 and the release operation thereof. The axial position of pulling head 28 is detected by rotational speed signal N of the electric motor. In response to on/off signals T of the trigger and rotational speed signal N of the electric motor, control circuit 55 of the control unit controls the operation of electric motor 13. Pulling head 28 retreats from home position HP at the front end to rear end position RP, stops at rear end position RP, advances from rear end position RP to home position HP at the front end and stops at home position HP.

A specific explanation is provided below regarding how electric motor 13, spindle 14, ball screw nut 44, ball screw 36, pulling head 28, jaw 29, etc. are controlled by control circuit 55 by means of the operation of trigger 6 and the rotational speed of electric motor 13. The rotational speed of electric motor 13 is detected by Hall element 13A, and electronic circuit 13B inputs rotation speed signal N of electric motor 13 into control circuit 55. Moreover, on/off signals T of trigger switch 49, which are turned on and off by the pulling operation of trigger 6 and the release operation thereof, are inputted into control circuit 55. Control circuit 55 is provided with signal processing unit 55A. Signal processing unit 55 A receives the rotation speed signal N of electric motor 13 and on/off signals T of trigger switch 49, and outputs forward rotation signal SN and reverse rotation signal SR.

Moreover, control circuit 55 is provided with driver 55B. The driver 55B receives forward rotation signal SN and reverse rotation signal SR from signal processing unit 55A, and controls electric power supplied from battery 51 to cause electric motor 13 to rotate forwardly, rotate reversely, and stop. Signal processing unit 55A and driver 55B, which constitute control circuit 55, are provided, for example, in the space of handle 3.

When pulling head 28 is at home position HP (position shown in FIG. 4), the number of rotations of electric motor 13 is set to zero No. When the number of rotations of electric motor 13 is zero No. and ON signal ToN is not output from trigger switch 49 of trigger 6 (or OFF signal ToFF is outputted), pulling head 28 is at home position HP. Based on OFF signal ToFF from trigger switch 49 of trigger 6 and zero No. as the number of rotations of electric motor 13, the control circuit recognizes that pulling head 28 is at home position HP. As long as trigger 6 is not operated, pulling head 28 remains at home position HP.

When trigger 6 is pulled in a state where the number of rotations of electric motor 13 is zero, ON signal ToN is outputted from trigger switch 49, signal processing unit 55A of control circuit 55 provided in electric blind rivet fastening device 1 outputs forward rotation signal SN to forwardly rotate electric motor 13. Upon receipt of forward rotation signal SN, driver 55 B sends the electric power from battery 51 to electric motor 13 to forwardly rotate electric motor 13.

When electric motor 13 rotates forwardly, the forward rotations are transmitted through motor gear 15, rear gear 19, second shaft 18, front gear 21, and spindle gear 17 to spindle 14 to forwardly rotate spindle 14. When spindle 14 rotates forwardly, ball screw nut 44 also rotates forwardly, ball screw shaft 36 retreats in the axial direction, and pulling head 28 retreats in the axial direction by a predetermined length from home position HP at the front end. As a result of this rearward movement, jaw 29 retreats from the position of the front end, and mandrel shaft unit 75J of blind rivet 70 held by jaw 29 is retracted into the rear direction.

When mandrel shaft unit 75J is retracted in the rear direction, mandrel head 75H deforms a part of sleeve 71S of rivet main body 71 to enlarge the diameter of the sleeve, and the fastened member is firmly sandwiched between the expanded portion of the sleeve and flange 71F of rivet main body 71. If mandrel shaft unit 75J keeps being retracted in the rear direction, mandrel shaft unit 75J becomes broken. A plurality of fastened members such as a vehicle body panel and parts are firmly clamped between the expanded portion of the sleeve and flange 71F, and parts and the like are fixated to the vehicle body panel.

The number of rotations N of electric motor 13 is detected by hall element 13A to determine the axial position of pulling head 28. When pulling head 28 moves to rear end position RP behind the position where the mandrel shaft unit 75J breaks, by means of the rotations of a predetermined number of electric motor 13 (the number of rotations corresponding to the shift length of pulling head 28 slightly longer than the length at which the mandrel shank is destroyed), the predetermined number of rotations NR of brushless motor 13 is counted by means of the signal indicating the number of rotations sent from electronic circuit 13B. Moreover, because trigger 6 remains pulled, ON signal ToN is output from trigger switch 49.

In a state in which ON signal ToN is outputted from trigger switch 49, when the predetermined number of rotations NR of electric motor 13 is counted, pulling head 28 is positioned in rear end position RP on the furthest rear side. At this time, signal processing unit 55A of control circuit 55 receives ON signal ToN from trigger switch 49 and the count of predetermined number of rotations NR of electric motor 13, and rotates electric motor 13 at a low speed. When electric motor 13 rotates at a low speed, spindle 14 rotates at a low speed. At rear end position RP, the engagement between spindle clutch 61 and nut clutch 62 is released. Even when spindle 14 is rotating, ball screw 44 does not rotate, and pulling head 28 (jaw 29) stops at rear end position RP.

Alternatively, the control may be designed so that electric motor 13 is completely stopped when pulling head 28 is at rear end position RP.

In the state in which electric motor 13 rotates at a low speed (or stops rotating) and pulling head 28 is at rear end position RP, when the pulling operation of trigger 6 is canceled, ON signal ToN from trigger switch 49 of trigger 6 disappears (or off signal ToFF is output).

When receiving off signal ToFF from trigger switch 49 and the count of predetermined number of revolutions NR of electric motor 13, signal processing unit 55A of control circuit 55 outputs reverse rotation signal SR. Upon receiving reverse rotation signal SR, driver 55B rotates electric motor 13 in the reverse direction. When electric motor 13 rotates in the reverse direction, spindle 14 also rotates in the reverse direction. Because spindle clutch 61 and nut clutch 62 are engaged, ball screw nut 44 also rotates in the reverse direction. Ball screw shaft 36 moves forward. Pulling head 28 moves from rear end position RP toward home position HP at the front end.

When pulling head 28 returns to home position HP, the number of rotations of electric motor 13 is subtracted, and the number of rotations becomes zero No. Control circuit 55 stops reverse rotation signal SR in response to OFF signal (ToFF) from trigger switch 49 and the number of rotations zero No. of electric motor 13. In this case, taking account of the deviation of home position HP of pulling head 28, the constitution is designed in a manner so that spindle 14 always rotates extra times in the reverse direction at home position HP. Spindle clutch 61 and nut clutch 62 slip at home position HP to position pulling head 28 at home position HP. Electric motor 13 and spindle 14 stop rotating after rotating several extra rotations.

Alternatively, the control may be designed in a manner so that spindle 14 stops immediately when pulling head 28 returns to the home position HP, and spindle clutch 61 and nut clutch 62 do not slip in the normal state.

When pulling head 28 returns to home position HP, unless trigger 6 is operated next, signal processing unit 55A does not operate electric motor 13. Therefore, pulling head 28 remains at the home position HP while electric motor 13 remains stopped.

Moreover, when the pulling operation of trigger 6 is canceled in a state where electric motor 13 does not reach the predetermined rotational speed during the forward rotation of electric motor 13, signal processing unit 55A of control circuit 55 receives the number of rotations signal N of electric motor 13 and OFF signal ToFF of trigger switch 49, and sends reverse rotation signal SR to driver 55 B; and driver 55B rotates electric motor 13 in the reverse direction. The reverse rotations of electric motor 13 are continued until the count of the number of rotations of electric motor 13 reaches zero No., and pulling head 28 (jaw 29) is returned to home position HP. This ensures that pulling head 28 is returned to home position HP even if the fastening operation of the blind rivet is interrupted for some reason.

As stated above, even when pulling head 28 retreats to predetermined rear end position RP, or even when the forward rotations of spindle 14 do not stop, due to some abnormality, the engagement between spindle clutch 61 and nut clutch 62 is released at rear end position RP to prevent pulling head 28 from being retracted excessively. Moreover, even when pulling head 28 returns to home position HP, or even when the reverse rotations of spindle 14 do not stop and abnormal torque is applied, due to some abnormality, first inclined surface 61C2 of spindle clutch 61 and second inclined surface 62C2 of nut clutch 62 slip. In this way, it becomes possible to prevent pulling head 28 from protruding forward from home position HP.

According to the embodiment of the present invention, when the electric motor rotates forwardly, the vertical surface of the spindle clutch transmits the rotational force, and the mandrel shaft unit can be retracted strongly. By retracting the spindle clutch in the axial direction at rear end position RP, the engagement between the spindle clutch and the nut clutch is released. When the electric motor rotates in the reverse direction, the inclined surface of the spindle clutch transmits the rotational force. At home position HP, the first inclined surface of the spindle clutch slips on the second inclined surface of the nut clutch. As described above, according to the embodiment of the present invention, when the electric motor rotates forwardly, the engagement of the clutch is released at rear end position RP of the pulling head; and when the electric motor rotates in the reverse direction, the clutches slip at home position HP. These two functions are conducted by one clutch device, which decreases the number of parts.

Moreover, because the position of the clutch is located closer to the spindle than to the ball screw shaft, when the pulling head is caused to return to the home position, and when the ball screw shaft cannot move forward due to foreign matter becoming caught, the first inclined surface of the spindle clutch and the second inclined surface of the nut clutch slide to stop the ball screw shaft from moving forward. Thus, it becomes possible to prevent the nose housing and the internal parts thereof from being broken.

The invention claimed is:

1. A blind rivet fastening device for fastening a blind rivet including a mandrel and a rivet main body to a member to be attached, the blind rivet fastening device comprising:
   a device housing;
   an electric motor disposed at a rear end of the device housing;
   a spindle disposed in front of the electric motor;
   a power transmission unit that transmits torque between the electric motor and the spindle;
   a ball screw nut which is adjacent to the spindle and to which torque can be selectively transmitted from the spindle;
   a ball screw shaft provided at a central portion of the ball screw nut that moves in an axial direction by rotation of the ball screw nut;
   a retracting unit connected to the ball screw shaft and configured to grasp and retract a shaft unit of the mandrel between a home position and a rear end position;
   a position detector for detecting an axial position of the retracting unit,
   a trigger provided in a handle portion of the blind rivet fastening device for selectively energizing the electric motor;
   a control unit that controls forward rotation, reverse rotation, start, and stop of the electric motor according to a pulling operation of the trigger and the position of the retracting unit detected by the position detector;
   a clutch including a spindle clutch portion disposed on the spindle and a nut clutch portion disposed on the ball screw nut, the clutch for selectively transferring torque between the spindle clutch portion and the nut clutch portion when the retracting unit is in the rear end position or the home position;
   the spindle clutch portion having a cylindrical unit and a flange unit at one end of the cylindrical unit, wherein a plurality of first segment units are formed on a front plane of the flange unit, the spindle clutch portion rotating integrally with the spindle; and
   the nut clutch portion including a plurality of second segment units complementary in shape to the plurality of first segment units of the spindle clutch, the second segment units integrally formed on a rear plane of the ball screw nut,
   wherein the spindle clutch portion has a protruding unit extending radially outward of the plurality of first segment units, the protruding unit being accommodated in an axially extending slot formed in a cylinder of the spindle, and the spindle clutch portion is held so that it is movable in the axial direction with respect to the spindle but not respectively rotated.

2. The blind rivet fastening device according to claim 1, further including a tail shaft, the tail shaft disposed behind the ball screw shaft and the tail shaft not movable in the axial direction, the tail shaft also including a flange-like tail flange formed at the rear end unit, the tail flange, and a spindle clutch portion spring disposed between the spindle clutch portion and the rear end unit of the spindle clutch portion.

3. The blind rivet fastening device according to claim 1, wherein the plurality of second segment units each includes an end portion in a circumferential direction, each end portion defining a plane perpendicular to the rear plane of the nut clutch portion, and the other end includes a second plane inclined with respect to the rear plane of the nut clutch portion; wherein the second plane of each of the second segment units engages a first vertical plane of each of the first segment units, and the second inclined planes of the second segment units engage the first inclined planes of the first segment units.

4. The blind rivet fastening device according to claim 1, wherein the blind rivet fastening device further includes a nose-piece disposed on a tip portion of the device having an opening portion through which a shaft unit of the mandrel is configured to pass; the retracting unit of the blind rivet fastening device preferably including a jaw case with a pulling head that moves in the axial direction by axial movement of the ball screw shaft, and an inner circumferential plane positioned integrally with the pulling head adjacent to the pulling head whose inner diameter decreases toward a front end; and an outer circumferential plane positioned within the jaw case and abutting against the inner circumferential plane of the jaw case.

5. The blind rivet fastening device according to claim 1, wherein the power transmission unit has a motor gear coupled to the electric motor, a rear gear provided below the motor gear and engaged with the motor gear, a spindle gear coupled to the spindle, a front gear provided below the spindle gear and engaged with the spindle gear, and a second shaft provided under the recovery container, integrally connecting the rear gear and the front gear.

6. The blind rivet fastening device according to claim 1, wherein the position detector comprises a rotation number detecting element for detecting a number of rotations of the electric motor.

7. The clutch device according to claim 1, wherein the spindle clutch portion has a projecting portion radially outward of at least one of the first segment units to hold the spindle clutch portion so as not to rotate with respect to the spindle.

8. A blind rivet fastening device for fastening a blind rivet including a mandrel and a rivet main body to a member to be attached, the blind rivet fastening device comprising:
a device housing;
an electric motor disposed at a rear end of the device housing;
a spindle disposed in front of the electric motor;
a power transmission unit that transmits torque between the electric motor and the spindle;
a ball screw nut which is adjacent to the spindle and to which torque can be selectively transmitted from the spindle;
a ball screw shaft provided at a central portion of the ball screw nut that moves in an axial direction by rotation of the ball screw nut;
a retracting unit connected to the ball screw shaft and configured to grasp and retract a shaft unit of the mandrel between a home position and a rear end position;
a position detector for detecting an axial position of the retracting unit,
a trigger provided in a handle portion of the blind rivet fastening device for selectively energizing the electric motor;
a control unit that controls forward rotation, reverse rotation, start, and stop of the electric motor according to a pulling operation of the trigger and the position of the retracting unit detected by the position detector;
a clutch including a spindle clutch portion and a nut clutch portion, the clutch for selectively transferring torque between the spindle clutch portion and the nut clutch portion when the retracting unit is in the rear end position and the home position;
the spindle clutch portion having a cylindrical unit and a flange unit at one end of the cylindrical unit, wherein a plurality of first segment units are formed on a front plane of the flange unit, the spindle clutch portion rotating integrally with the spindle; and
the nut clutch portion including a plurality of second segment units complementary in shape to the first segment units of the spindle clutch, the second segment units integrally formed on a rear plane of the ball screw nut,
wherein a tail cap of a ring shape is connected to a rear end unit of the ball screw shaft, the spindle clutch portion has a step unit at the rear end unit to which the tail cap can be engaged, and wherein when the ball screw shaft moves rearwards, the tail cap pushes the step unit of the spindle clutch portion so that the engagement of the spindle clutch portion and the ball screw shaft is released.

9. A blind rivet fastening device for fastening a blind rivet including a mandrel and a rivet main body to a member to be attached, the blind rivet fastening device comprising:
a device housing;
an electric motor disposed at a rear end of the device housing;
a spindle disposed in front of the electric motor;
a power transmission unit that transmits torque between the electric motor and the spindle;
a ball screw nut which is adjacent to the spindle and to which torque can be selectively transmitted from the spindle;
a ball screw shaft provided at a central portion of the ball screw nut that moves in an axial direction by rotation of the ball screw nut;
a retracting unit connected to the ball screw shaft and configured to grasp and retract a shaft unit of the mandrel between a home position and a rear end position;
a position detector for detecting an axial position of the retracting unit,
a trigger provided in a handle portion of the blind rivet setting device for selectively energizing the electric motor;
a control unit that controls forward rotation, reverse rotation, start, and stop of the electric motor according to the pulling operation of the trigger and the position of the retracting unit detected by the position detector;
a clutch including a spindle clutch portion and a nut clutch portion, the clutch for selectively transferring torque between the spindle clutch portion and the nut clutch portion when the retracting unit is in the rear end position and the home position;
the spindle clutch portion having a cylindrical unit and a flange unit at one end of the cylindrical unit, wherein a plurality of first segment units are formed on a front plane of the flange unit, the spindle clutch portion rotating integrally with the spindle; and
the nut clutch portion including a plurality of second segment units complementary in shape to the first segment units of the spindle clutch, the second segment units integrally formed on a rear plane of the ball screw nut, wherein the plurality of first segment units of the spindle clutch portion include an end plane in a circumferential direction that is perpendicular to a front plane of the flange unit, and another end plane in the circumferential direction is inclined with respect to the front plane of the flange unit.

* * * * *